United States Patent [19]

Duvall, Jr.

[11] Patent Number: 5,704,008
[45] Date of Patent: Dec. 30, 1997

[54] METHOD OF AND APPARATUS FOR MOTOR VEHICLE SECURITY ASSURANCE EMPLOYING VOICE RECOGNITION CONTROL OF VEHICLE OPERATION

[75] Inventor: William Robert Duvall, Jr., Sudbury, Mass.

[73] Assignee: LoJack Corporation, Dedham, Mass.

[21] Appl. No.: 166,580

[22] Filed: Dec. 13, 1993

[51] Int. Cl.$^6$ .................................................. G10L 3/00
[52] U.S. Cl. ...................... 395/2.82; 395/2.83; 395/2.84
[58] Field of Search ...................... 395/2.82; 340/426; 235/382; 381/82, 43, 51, 110; 307/10.2

[56] References Cited

U.S. PATENT DOCUMENTS

| | | | |
|---|---|---|---|
| 4,797,924 | 1/1989 | Schnars et al. | 381/43 |
| 4,856,072 | 8/1989 | Schneider et al. | 381/86 |
| 5,020,628 | 6/1991 | Bigliardi et al. | 180/272 |
| 5,055,658 | 10/1991 | Cockburn | 235/382 |
| 5,079,435 | 1/1992 | Tanaka | 307/10.2 |
| 5,172,094 | 12/1992 | Stadler | 340/426 |
| 5,513,107 | 4/1996 | Gormley | 364/424.05 |

OTHER PUBLICATIONS

Hassan et al., "Voice Recognition Digital Cipher Lock for SmartVehicles", Proc. of the 36th Midwest Symp. on Circ. and Systems, vol. 1, pp. 352–355, Aug. 1993.

Primary Examiner—Allen R. MacDonald
Assistant Examiner—Vijay B. Chawan
Attorney, Agent, or Firm—Rines and Rines

[57] ABSTRACT

A vehicle theft prevention/security system having a concealed module capable of learning, and then recognizing the voice of the owner or authorized operator. The module controls (switches) the operation of a concealed relay that normally interrupts current to the starter solenoid or ignition system unless the owner or authorized operator speaks into a conveniently mounted microphone within the vehicle. The module may be programmed to recognize the voice of the owner or authorized user, regardless of the spoken word(s), or the module may be programmed to recognize only a certain password spoken only by a certain owner or authorized user. Once the module recognizes the owner or authorized user, the relay then switches to provide current to the previously interrupted ignition system or starter solenoid. The module provides audio output/feedback to the owner or authorized user during operation.

21 Claims, 3 Drawing Sheets

METHOD OF AND APPARATUS FOR MOTOR VEHICLE SECURITY ASSURANCE EMPLOYING VOICE RECOGNITION CONTROL OF VEHICLE OPERATION

The present invention relates to vehicle security techniques and more particularly to security systems of the type controlled by the recognition of the authorized vehicle operator's (or owner's) voice "print" pattern and characteristics.

BACKGROUND

The art is replete with a myriad of systems employing different types and applications for the control of various apparatus in response to the recognition of the spoken voice of an authorized user, including security systems for preventing the unauthorized use of motor vehicles. A voice-controlled elevator security system is disclosed, for example, in U.S. Pat. No. 4,534,056, in which the potential user's voice signal is digitized and stored as an authorized users such that later comparision of a voice instruction with the stored digital representation of authorized "voices" would initiate an elevator call signal for those landings to which the authorized user is to be permitted access. Other voice control applications have been suggested for controlling air conditioning (U.S. Pat. No. 4,516,207). An electric or microwave oven door latch is similarly opened by recognition of a voice command in U.S. Pat. No. 4,472,617. General access control systems are described in U.S. Pat. No. 4,449,189 using not only speech recognition, but also the visual facial features of the speaker during uttering key words. As for the use of voice pattern recognition in controlling the operation of parts of an automotive vehicle, this was addressed, for example, in an article entitled "Voice Control in Motor Vehicles" by Eugene Helms, appearing on pp. 93–98 of Feb. 24–28, 1986 publication of the Society of Automotive Engieers. Earlier publications include Byte Publications, Inc. January 1984, "Speech Recognition: An Idea Whose Time Is Coming", pp. 213–222, and Electronics Week, Apr. 22, 1985, "Speech Technology Leaves The Realm of Science Fiction", pp. 61–63. Voice-actuated control systems which can control vehicle accessories such as windows, headlights, mirrors, radios, air conditioning, door and trunk locks, etc. are described in U.S. Pat. No. 4,401, 852; 4,449,310; 4,450,545; 4,503,528; 4,501,012; 4,506, 377; 4,506,378; 4,528,687; 4,531,228; 4,532,648; 4,538, 295; 4,558,459; 4,593,403; 4,637,045; 4,797,924; and 4,827,520; and in British Patent GB2224773. A two speed axle system for a vehicle which can be voice activated by the operator is described in U.S. Pat. No. 4,802,363.

Among prior patents that have specifically addressed various types of voice-actuated vehicle security systems for automotive vehicle ignition control are U.S. Pat. No. 4,797, 924, 4,856,072 and 5,055,658.

Such proposals, however, have not found general use, apparently because of several important drawbacks and disadvantages, including, but not limited to, complexity and expense, inadequate protection from defeating the security of the voice command system, and lack of simplicity and flexibility for readily adding new authorized users for the system.

It is to the overcoming of such and other limitations that the present invention is primarily directed, providing a different, universal, simpler, less expensive and more secure approach to the control of a vehicle starter or ignition through the use of voice recognition actuation and cessation.

OBJECTS OF INVENTION

It is accordingly an object of the present invention to provide a new and improved method of and apparatus for motor vehicle security assurance, employing improved voice recognition control of the starting of the vehicle engine that obviates the above-described and other disadvantages of prior proposals.

A further object is to provide such an improvement using a novel concept of voice recognition module/ implementation controlling the vehicle starter solenoid and/ or ignition system operability by voice commands.

Other and further objects will be hereinafter pointed out and more specifically delineated in the appended claims.

SUMMARY

In summary, from one of its viewpoints, the invention embraces a method of providing voice recognition motor vehicle security, that comprises, inserting a circuit-interrupting device permanently in the vehicle engine starter or ignition circuit that is normally operated with a key switch; connecting a voice recognition module to the device and the ignition circuit normally to maintain the circuit open-circuited; introducing an authorized vehicle user's voice spoken within the vehicle,to the voice recognition module, first to enable the learning and storage of the authorized user's voice pattern and commands, and then subsequently to respond to the receipt of the authorized user's voice, uttered when desiring to start the vehicle engine, to cause the circuit interrupting device to cease interrupting the starter or ignition circuit and to close the same, thereby enabling the starting of the engine by said authorized user.

Preferred and best mode design features, apparatus and modifications are hereinafter presented.

DRAWINGS

The invention will now be described with reference to the accompanying drawings, FIG. 1A of which is a block and circuit diagram illustrating the preferred wiring connections of the voice recognition and ignition circuits in accordance with the invention;

PREFERRED EMBODIMENT(S)

Figure 1A:
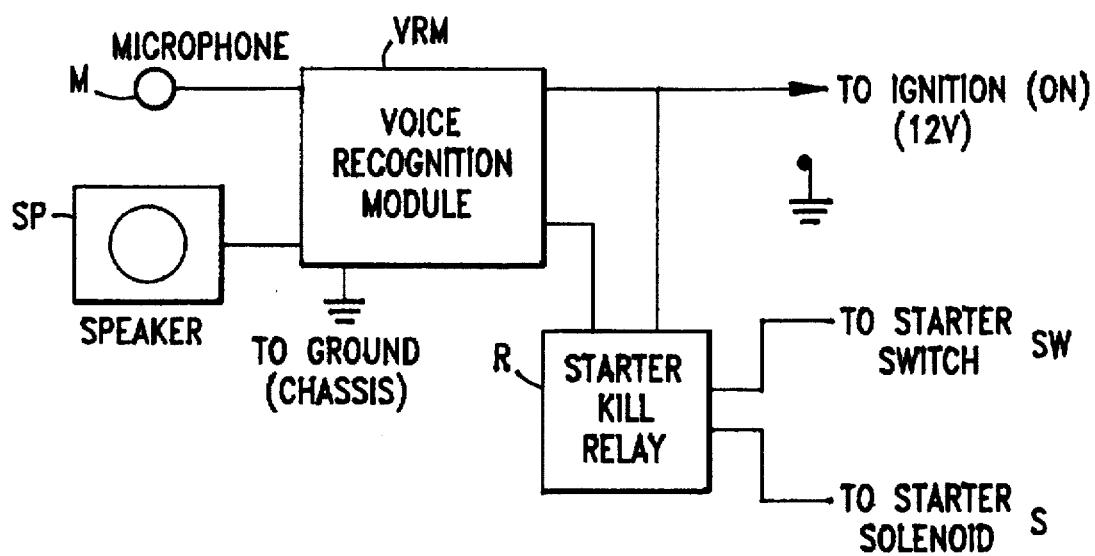
FIG. 1B is a diagram of a preferred physical layout in the vehicle of components of the system of FIG. 1A.

In accordance with the technique underlying the invention, the electrical energizing system for engine ignition in the automobile vehicle or the like is modified, as shown in FIG. 1A, to provide a starter kill or energize relay R, as of the electrically operated solenoid type or other electrically controllable switch, permanently interposed in the starter or ignition circuit between the operator key-activated starter switch SW in the vehicle to the positive terminal of the vehicle battery B, such as the conventional chassis-grounded 12 volt storage cell or the like. This enables the flow of energizing current for the starter solenoid S if the relay R is closed. In the normal condition of operation of the invention, however, the relay R is open-circuited, normally preventing or interrupting any possible current flowing to the starter solenoid from the battery to energize the starter solenoid.

Figure 1B:
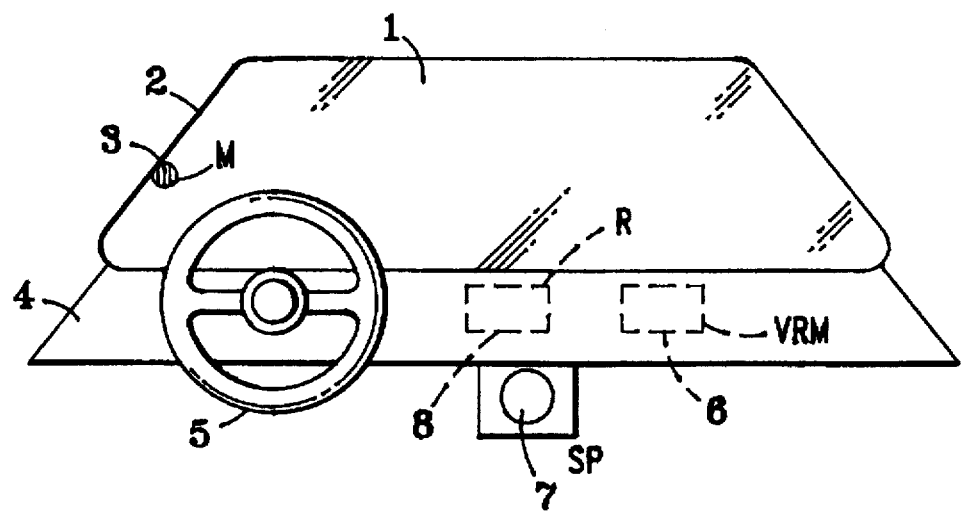

Further in accordance with the technique of the invention, a voice recognition module VRM is also interposed in the above-mentioned ignition circuit, responsive, as hereinafter explained, to the voice pattern of the authorized vehicle user, expressed by the user speaking into a microphone M, also in the vehicle, preferably forward of the driver's seat area, as at the left hand region 3 of the windshield 1, FIG. 1B, adjacent the "A" pillar 2. The starter kill relay 8 and voice recognition module VRM may be concealed under the dashboard 4 to the right of the steering wheel 5 at respective positions 8 and 6, and a feedback response speaker SP may be more forwardly mounted at position 7.

Upon the proper interfacing between the user's spoken words or commands, received in the microphone M, and the voice recognition module VRM, under the novel protocol of the invention, and recognition of the voice of the authorized user, the VRM will generate a control signal for operating the relay R and thus conditioning the system for engine ignition.

Figure 2A:
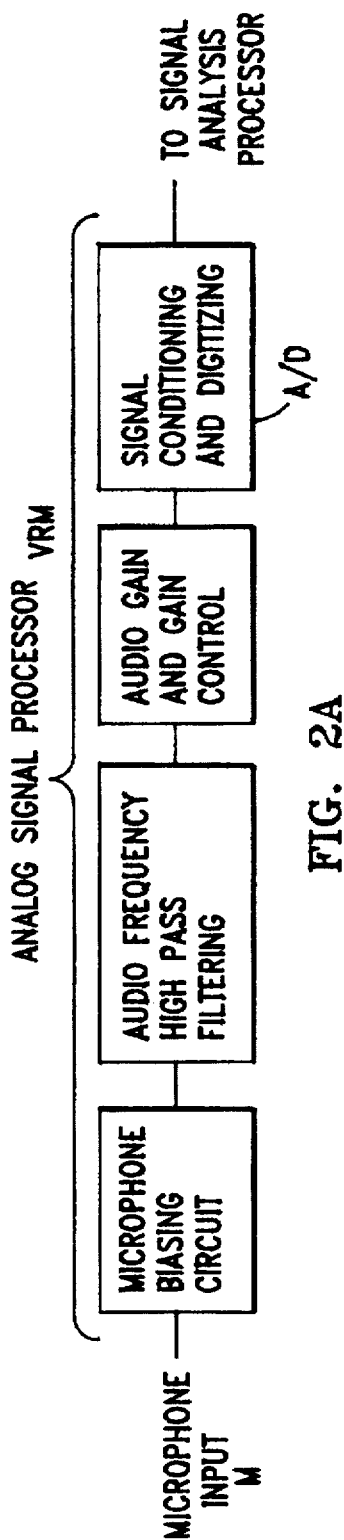
FIGS. 2A and 2B are functional block diagrams of the analog and digital signal processing circuts, respectively, of the voice recognition module of FIG. 1A.
Figure 2B:
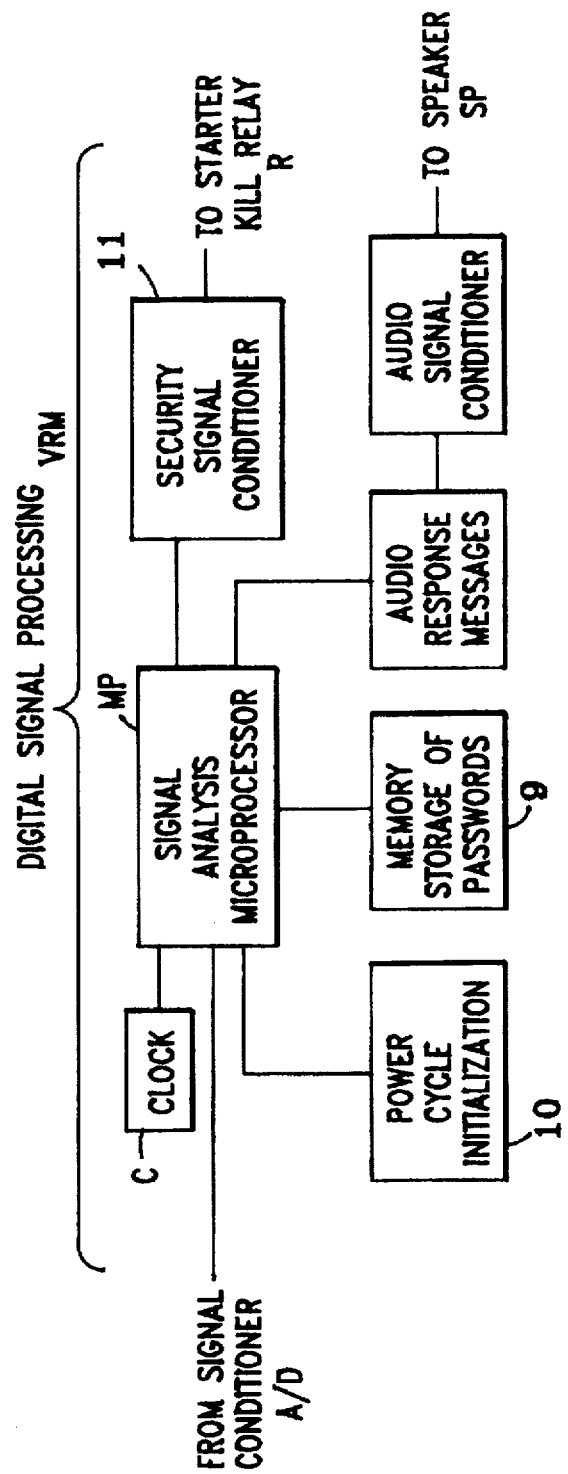

While the VRM may embody circuits of the types described in the before-cited prior patents, preferred analog and digital signal processing sections thereof are presented, as before stated, in respective FIGS. 2A and 2B. As shown in FIG. 2A, the analog voice signal received in the microphone M, after appropriate audio frequency filtering and gain control, is signal conditioned and digitized at A/D for application to the signal analyzing microprocessing MP, FIG. 2B, that analyzes the digital representation of the received voice pattern in well-known fashion and as described in greater detail in said patents. Passwords spoken by the authorized user into the microphone M and so analyzed, are stored at 9 for later checking with voice commands during use of the vehicle. Prepared replies or reponses to the voice commands are generated and signal conditioned for analog reproduction in the speaker SP.

Figure 3:
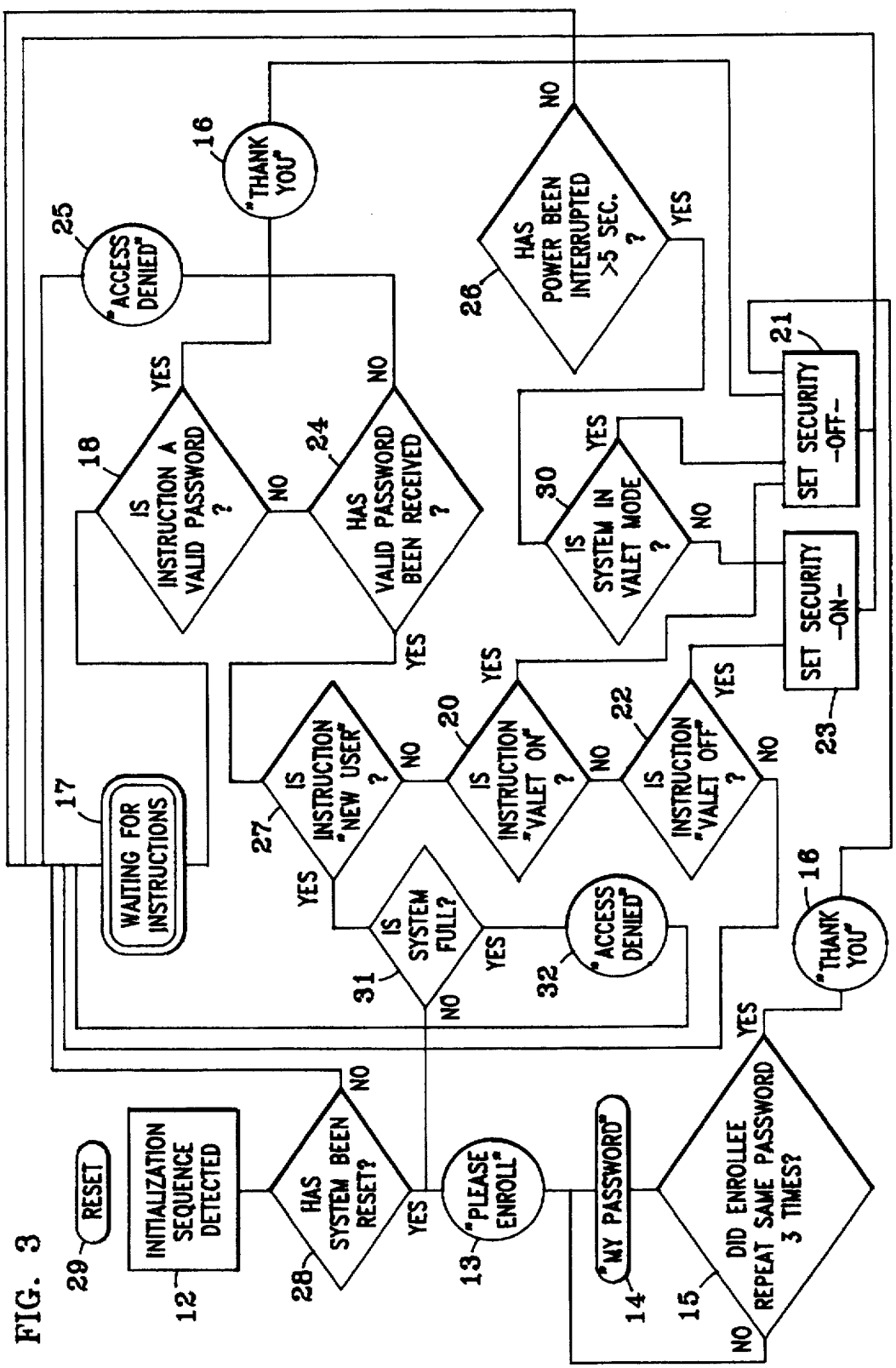
FIG. 3 is a flow diagram of the operation of the system of FIGS. 1A,2A and 2B.

For initializing purposes, as later described, a power interrupt circuit 10 is provided as a further input to the microprocessor MP, additional to the digitized voice signal input and the clock control input C. As shown, the microprocessor MP, upon recognizing an authorized voice command, causes a security signal conditioner 11 to generate a control signal that will close the before-described normally open starter kill relay R and enable starter or ignition circuit operation, as now traced in the flow diagram of FIG. 3.

The authorized vehicle owner or user may initialize the voice recognition module VRM (12, FIG. 3) upon entering the vehicle and inserting and turning the ignition key at the starter switch SW, FIG. 1A, to the conventional "ON" position. The user then gives an initializing voice instruction such as "Initialize LVR".

The voice recognition module may be reset (29, FIG. 3) at the time of its manufacture by the original manufacturer, or by a special tool held only by certain authorized individuals. The user may also use an alternate form of initialization, such as operating the ignition key switch from OFF to ON, say four times sucessively, only after it has been determined that the system has been reset (29, FIG. 3). The loud speaker SP issues a request 13, "Please Enroll", to introduce the user's spoken password for pattern analysis and learning at MP and storage at 9, FIG. 2B. The user then speaks a password at 14, FIG. 3, preferably several separate times, such as a single word spoken three times, with pausing between each utterance, which, when learned (15), will elicit in the loudspeaker SP an acknowledgment 16 such as "Thank You" or "Initial Enrollment Successful", or the like. Preferably, for added security and to prevent unauthorized operation, the VRM system will not accept further initializing instructions after the first user has enrolled. This user will now hereinafter be recognized when the user desires to operate the vehicle, the system being primed to await the user's future voice command at 17. When the user desires to operate the vehicle, the user inserts and turns the ignition key to "ON" and speaks the user's correct password, above, as at 18, which, when verified at MP to correspond to the learned voice and password, elicits a "Thank You" response at 19. This also readies the security enabling signal control 11, Fig, 2B, and returns for the user's next voice instruction (17, FIG. 2), such as "VALET ON" (20) FIG. 3, to generate the security enabling off signal at 21 that will suspend the starter interrupt or open-circuit funtionality and close the starter relay, completing the ignition circuit to the battery B. A reply may verify, if desired, and the user may now start the engine by use of the key only.

After operating the vehicle, the user may again secure the engine ignition system by key insertion, turning the ignition "ON" and speaking the command "VALET OFF" or the like at 22 (directly or, if desired, after again speaking the password), setting the security signal control off at 23, and re-opening or re-activating the interruption functionality of the starter kill relay R. The vehicle is thus rendered secure again and may be started only with the key and the correct spoken password and command, as before outlined.

In the event of an invalid voice command or password at 24, access will be denied and so stated at 25. Should power be interrupted more than a short time, moreover, say five seconds (26), the security signal interrrupt will also be set at 23, preventing ignition.

Where it is desired that the voice of more than one user be authorized, the following procedure may be followed. In order to enroll an additional user, the first user enrolled must enter the vehicle, insert and turn the key to "ON", speak that original user's password (18) to identify the user, and then speak an instruction such as "New User" at 27 (for which the original user is obviously standing sponser.) The second thusly introduced user than speaks a second password (at 14), again three times, for example, receiving audio confirmation of enrollment at 16. The second user may then operate the vehicle in the manner outlined above for the original user. Clearly a predetermined number of further multiple authorized users may similarly be enrolled, the system being adjusted to accomodate, for example, up to ten authorized users, and preventing further users, 31.

All interaction to the VRM system of the invention preferably occurs with the doors and windows of the motor vehicles in closed position. If the system rejects any instructions, the reply, as previously stated, will be "Access Denied" (25), whether the voice instruction was to enroll or to operate the vehicle.

If desired, moreover, instead of the preferred programming for a particular user-voice password(s), the module could be programmed to recognize the voice of the owner or authorized user regardless of the spoken word(s). Once the VRM recognizes the owner or authorized user, the starter kill relay R would then be switched at 21 to provide current to the previously interrupted or open-circuit starter solenoid S, FIG. 1A of the ignition system.

While the invention has been described in connection with its application to vehicle security systems involving the prevention of unauthorized attempts at engine starting the technique herein could similarly be employed to enable control of other security functions within the vehicle, such as power door locks, entry alarm, trunk release, etc; and also for battery or other powered controls in other applications than automotive vehicles having similar control systems. Further modifications will also occur to those skilled in this art, and such are considered to fall within the spirit and scope of the invention as defined in the appended claims.

What is claimed is:

1. A method of providing voice recognition motor vehicle security, that comprises, inserting a circuit-interrupting starter kill device permanently in the vehicle engine starter and/or ignition circuit that is normally started with a key switch; connecting a voice recognition module to the starter and/or ignition circuit normally to maintain the circuit open-circuited; and introducing an authorized vehicle user's voice, spoken within the vehicle, to the voice recognition module, first to enable the learning and storage of the authorized user's voice pattern and commands, and then subsequently to respond to the receipt of the authorized user's voice, uttered when desiring to start the vehicle engine, to cause the starter kill device to cease interrupting the starter and/or ignition circuit and to close the same, thereby enabling the starting of the engine by said authorized user, and in which the said learning and storage is effected by the user turning on the ignition circuit key switch and then speaking a password or other words into a microphone connected to the voice recognition module, and in which, when the user wishes to secure the vehicle again, after speaking the password or other words, with the ignition circuit key switch on, the user requests ignition circuit re-interruption, and the voice recognition module there upon causes the starter kill device to re-interrupt the starter and/or ignition circuit.

2. A method as claimed in claim 1 and in which the subsequent response to the receipt of the authorized user's voice is effected by the user turning on the ignition key switch and speaking said password or other words into said microphone and then voice requesting the enabling of the starting of the engine.

3. A method as claimed in claim 1 and in which the authorized user first commands initialization to enroll the user's voice in the voice recognition module, and then speaks a password for learning and storage.

4. A method as claimed in claim 1 and in which the voice recognition module and the starter kill relay are concealed within the vehicle.

5. A method of providing voice recognition motor vehicle security, that comprises, inserting a circuit-interrupting starter kill device permanently in the vehicle engine starter and/or ignition circuit that is normally started with a key switch; connecting a voice recognition module to the starter and/or ignition circuit normally to maintain the circuit open-circuited; and introducing an authorized vehicle user's voice, spoken within the vehicle, to the voice recognition module, first to enable the learning and storage of the authorized user's voice pattern and commands, and then subsequently to respond to the receipt of the authorized user's voice, uttered when desiring to start the vehicle engine, to cause the starter kill device to cease interrupting the starter and/or ignition circuit and to close the same, thereby enabling the starting of the engine by said authorized user, and in which the user adds another new authorized user by first speaking to establish identity with the voice recognition module, and then speaking to introduce a new user, and with the new user then speaking to enable the new user's voice to be learned and stored by the voice recognition module.

6. A method as claimed in claim 5 and in which the first authorized user effects the adding of another new user by turning the ignition circuit ignition key switch on and speaking such first user's password, and then speaking the instruction that a new user is to be enrolled, following which the new user speaks the new user's password for learning and storage.

7. A voice recognition motor vehicle security system having, in combination, an engine ignition circuit including an ignition key switch, a starter solenoid and a storage battery; starter kill relay means interposed permanently in the starter and/or ignition circuit and adjusted to be normally open-circuited to interrupt and prevent any possible current flow from the battery to the starter solenoid; voice recognition module means also connected with said ignition circuit and said starter kill relay means and responsive to voice commands of a vehicle user; microphone means disposed in the vehicle for receiving such voice commands of a vehicle user and connected to the voice recognition module means to introduce an authorized user's voice thereto; the voice recognition module means having means for learning and storing the authorized user's voice pattern and commands, and for subsequently responding thereto, following the uttering of the same by the authorized user after turning on said ignition key switch, to close the said starter kill relay means and complete the interrupted ignition circuit, thereby enabling the starting of the engine, and in which means is provided in the voice recognition module for learning and storing, and effective upon the user turning on the ignition key switch and then speaking a password or other words into said microphone, and in which, when the user wishes to secure the vehicle again, after speaking the password with the key switch on, means is provided for enabling the user to request ignition circuit re-interruption, and the voice recognition module, in response, thereupon causes the starter kill relay means to open and re-interrupt the ignition circuit.

8. A system as claimed in claim 7 and in which the subsequent response is effected by means operable as the user turns on the ignition key switch and speaks a password or other words into said microphone, followed by voice-requesting the enabling of the starting of the engine, the latter causing further means to thereupon generate a control signal to close the starter kill relay means.

9. A system as claimed in claim 7 and in which means is provided enabling the authorized user first to command initialization to enroll the user's voice in the voice recognition module means, and then to speak a password for learning and storage.

10. A system as claimed in claim 7 and in which the voice recognition module means and the starter kill relay means are concealed within the vehicle.

11. A system as claimed in claim 7 and in which the user operation of the ignition key switch and the user speaking into the microphone means is effected with the vehicle windows and doors closed.

12. A system as claimed in claim 7 and in which, upon the interruption of power for more than a few seconds, means is provided for causing the starter kill relay means automatically to interrupt the ignition circuit.

13. A system as claimed in claim 7 and in which the voice recognition module means is provided with means, operable in response to the user commands, for providing audio responses to the user in the vehicle.

14. A voice recongnition motor vehicle security system having, in combination, an engine ignition circuit including an ignition key switch, a starter solenoid and a storage battery; starter kill relay means interposed permanently in the starter and/or ignition circuit and adjusted to be normally open-circuited to interrupt and prevent any possible current flow from the battery to the starter solenoid, voice recognition module means also connected with said ignition circuit and said starter kill relay means and responsive to voice commands of a vehicle user, microphone means disposed in the vehicle for receiving such voice commands of a vehicle user and connected to the voice recognition module means to introduce an authorized user's voice thereto, the voice recognition module means having means for learning and storing the authorized user's voice pattern and commands, and for subsequently responding thereto, following the uttering of the same by the authorized user after turning on said ignition key switch, to close the said starter kill relay means and complete the interrupted ignition circuit, thereby enabling the starting of the engine, and in which means is provided to enable the user to add additional new authorized users by first speaking to establish identity with the voice recognition module means and then speaking to introduce a new user, and with the new user then speaking into the microphone means to enable the new user's voice to be learned and stored by the voice recognition module means.

15. A system as claimed in claim 14 and in which the first authorized user effects the adding of another new user by turning on the ignition circuit key and speaking such first user's password, and then speaking the instruction that a new user is to be enrolled; means being provided, responsive to the new user speaking the new user's password, for effecting learning by the voice recognition module means.

16. A system as claimed in claim 14 and in which the voice recognition module means is provided with means for preventing a new user enrollment when a predetermined number of users has been achieved or exceeded.

17. A voice recognition motor vehicle security system having in combination, an engine ignition circuit including an ignition key switch a starter solenoid and a storage battery; starter kill relay means interposed permanently in the starter and/or ignition circuit and adjusted to be normally open-circuited to interrupt and prevent any possible current flow from the battery to the starter solenoid; voice recognition module means also connected with said ignition circuit and said starter kill relay means and responsive to voice commands of a vehicle user; microphone means disposed in the vehicle for receiving such voice commands of a vehicle user and connected to the voice recognition module means to introduce an authorized user's voice thereto; the voice recognition module means having means for learning and storing the authorized user's voice pattern and commands, and for subsequently responding thereto, following the uttering of the same by the authorized user after turning on said ignition key switch, to close the said starter kill relay means and complete the interrupted ignition circuit thereby enabling the starting of the engine, and in which the voice recognition module means is provided with a reset means for rendering the system to be initializable, once again, and be able to establish a new set of authorized users.

18. A voice recognition motor vehicle security system having, in combination, an engine ignition circuit including an ignition key switch, a starter solenoid and a storage battery all interconnected by wires; starter kill relay means interposed by direct wire connection permanently in the starter and/or ignition circuit and adjusted to be normally open-circuited to interrupt and prevent any possible current flow from the battery along the interconnecting wires to the starter solenoid; voice recognition module means also connected with the wires connecting said ignition circuit and said starter kill relay means and responsive to voice commands of a vehicle user; microphone means disposed in the vehicle for receiving such voice commands of a vehicle user and connected to the voice recognition module means to introduce an authorized user's voice thereto;; the voice recognition module means having means for learning and storing the authorized user's voice pattern and commands, and for subsequently responding thereto, following the uttering of the same by the authorized user after turning on said ignition key switch, to close the said starter kill relay means and complete the interrupted wire connections of the ignition circuit, thereby enabling the starting of the engine, and in which means is provided to enable the user to add additional new authorized users by first speaking to establish identity with the voice recognition module means and then speaking to introduce a new user; and with the new user then speaking into the microphone means to enable the new user's voice to be learned and stored by the voice recognition module means.

19. A system as claimed in claim 18 and in which the first authorized user effects the adding of another new user by turning on the ignition circuit key and speaking such first user's password, and then speaking the instruction that a new user is to be enrolled; means being provided, responsive to the new user speaking the new user's password, for effecting learning by the voice recognition module means.

20. A system as claimed in claim 18 and in which the voice recognition module means and the starter kill relay means are concealed within the vehicle.

21. A system as claimed in claim 18 and in which the user operation of the ignition key switch and the user speaking into the microphone means is effected with the vehicle windows and doors closed.

* * * * *